US010699596B2

(12) United States Patent
Fischer et al.

(10) Patent No.: US 10,699,596 B2
(45) Date of Patent: Jun. 30, 2020

(54) VEHICLE OPERATOR TRAINING SYSTEM

(71) Applicant: Faraday&Future Inc., Gardena, CA (US)

(72) Inventors: Evan Roger Fischer, Torrance, CA (US); Jana Mahen Fernando, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 387 days.

(21) Appl. No.: 15/445,761

(22) Filed: Feb. 28, 2017

(65) Prior Publication Data

US 2017/0249856 A1  Aug. 31, 2017

Related U.S. Application Data

(60) Provisional application No. 62/301,548, filed on Feb. 29, 2016.

(51) Int. Cl.
*G09B 19/00* (2006.01)
*G09B 19/16* (2006.01)

(52) U.S. Cl.
CPC .................................. *G09B 19/16* (2013.01)

(58) Field of Classification Search
None
See application file for complete search history.

(56) References Cited

U.S. PATENT DOCUMENTS

| 8,323,025 B2* | 12/2012 | Freund | G09B 19/167 |
| | | | 434/62 |
| 2003/0006914 A1* | 1/2003 | Todoriki | B60L 58/13 |
| | | | 340/995.21 |
| 2005/0060069 A1* | 3/2005 | Breed | B60N 2/2863 |
| | | | 701/408 |
| 2005/0080543 A1* | 4/2005 | Lu | B60G 17/018 |
| | | | 701/70 |
| 2006/0284839 A1* | 12/2006 | Breed | B60W 50/16 |
| | | | 345/156 |
| 2009/0191513 A1* | 7/2009 | Wang | G09B 9/052 |
| | | | 434/69 |
| 2012/0068858 A1* | 3/2012 | Fredkin | G08G 1/096741 |
| | | | 340/902 |
| 2012/0296567 A1* | 11/2012 | Breed | G01C 21/26 |
| | | | 701/468 |
| 2013/0110369 A1* | 5/2013 | Breu | B60T 7/042 |
| | | | 701/70 |
| 2013/0162479 A1* | 6/2013 | Kelly | G01S 1/042 |
| | | | 342/385 |
| 2013/0302760 A1* | 11/2013 | Welles | G09B 9/052 |
| | | | 434/69 |

(Continued)

FOREIGN PATENT DOCUMENTS

CN  205003902 U  1/2016

*Primary Examiner* — Paul A D'Agostino

(57) ABSTRACT

Examples of the disclosure are directed to an automated vehicle that can function as a vehicle operator training system. A vehicle that combines sensors, actuators, infotainment, and/or communication functions may have the capability to provide a fully autonomous training experience in a real world environment. The vehicle can administer, monitor, and communicate with a vehicle operator for competency training and/or verification for a specific vehicle feature, sub-feature, situation maneuver, and/or objective.

13 Claims, 3 Drawing Sheets

(56) References Cited

U.S. PATENT DOCUMENTS

2013/0338877 A1* 12/2013 Straus .................. G08G 1/161
    701/41
2014/0236449 A1* 8/2014 Horn .................... B60W 30/16
    701/96
2014/0276090 A1* 9/2014 Breed ...................... A61B 5/18
    600/473
2014/0371981 A1* 12/2014 Nordbruch ........... G07C 5/0841
    701/36

* cited by examiner

VEHICLE OPERATOR TRAINING SYSTEM

CROSS-REFERENCE TO RELATED APPLICATION

This application claims the benefit under 35 U.S.C. § 119(e) of U.S. Provisional Application No. 62/301,548, filed Feb. 29, 2016, the entirety of which is hereby incorporated by reference.

FIELD OF THE DISCLOSURE

This relates generally to an automated vehicle that can function as a vehicle operator training system.

BACKGROUND OF THE DISCLOSURE

Racing and flight simulators can be valuable tools in training their operators to use the equipment in low-risk environments. These devices are usually costly and stand-alone from the target vehicle to be learned by an operator, pilot, etc. Another disadvantage of using simulators for training is that they are not able to completely replicate an authentic environment that training in a real vehicle provides. Further, operators need to be responsible for interacting with third parties directly for the purpose of confirming their vehicle operating competency (e.g., driver training and testing).

SUMMARY OF THE DISCLOSURE

Examples of the disclosure are directed to an automated vehicle that can function as a vehicle operator training system. A vehicle that combines sensors, actuators, infotainment, and/or communication functions may have the capability to provide a fully autonomous training experience in a real world environment. The vehicle can administer, monitor, and communicate with a vehicle operator for competency training and/or verification for a specific vehicle feature, sub-feature, situation maneuver, and/or objective.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to an automated vehicle that can function as a vehicle operator training system. A vehicle that combines sensors, actuators, infotainment, and/or communication functions may have the capability to provide a fully autonomous training experience in a real world environment. The vehicle can administer, monitor, and communicate with a vehicle operator for competency training and/or verification for a specific vehicle feature, sub-feature, situation maneuver, and/or objective. Exemplary training programs can include parallel parking, merging onto a freeway, changing gears in a manual transmission, driving a racecar on a racetrack, backing up and engaging a trailer, a comprehensive driver training and exam, parking in a parking lot, emergency maneuvers, bad weather driving, limit-handling, and driving with commercial trailers/payloads, among other possibilities.

Figure 1:
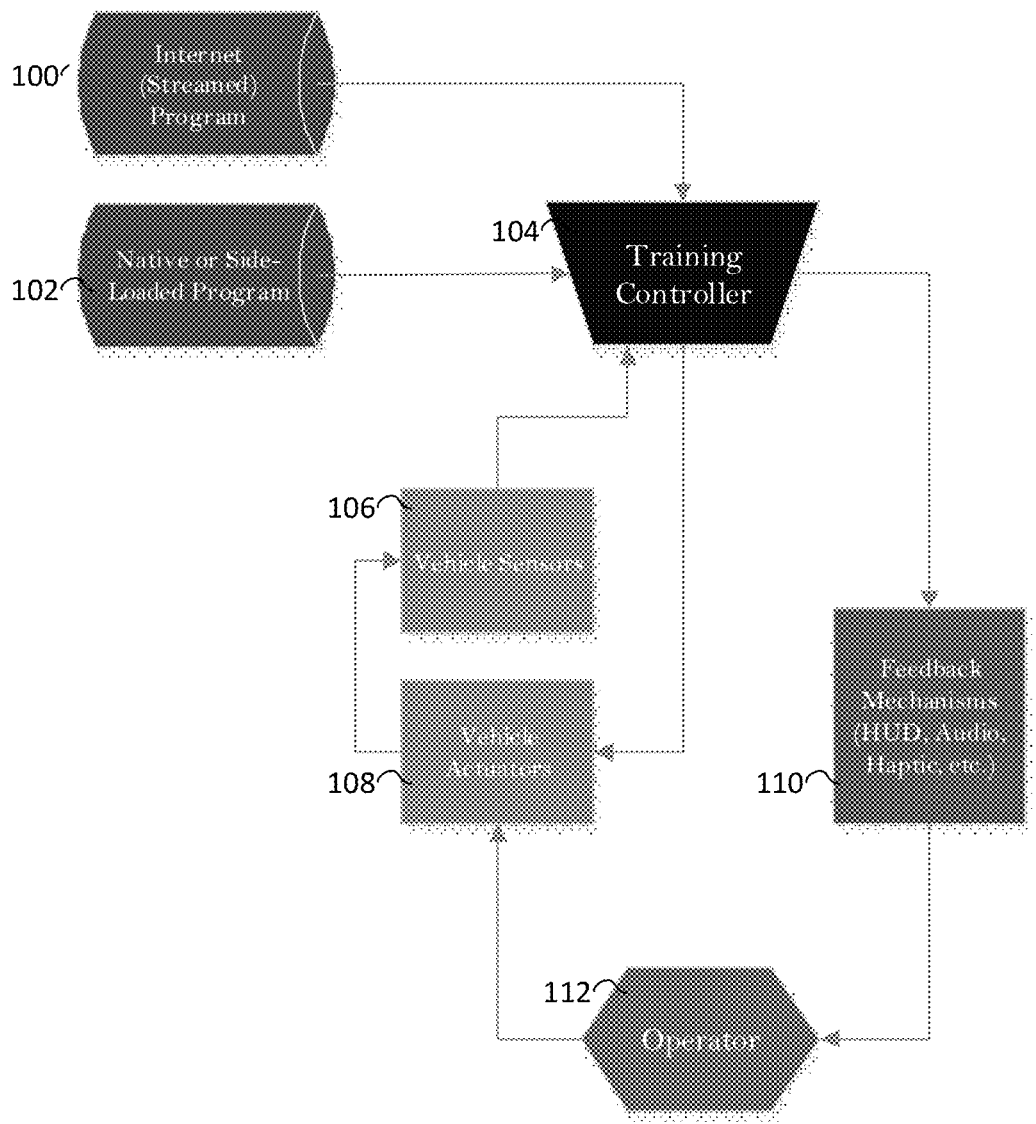
FIG. 1 illustrates an exemplary architecture for a vehicle operator training system according to examples of the disclosure.

FIG. 1 illustrates an exemplary architecture for a vehicle operator training system in a vehicle according to examples of the disclosure. The vehicle may include a training controller 104, implemented in hardware (e.g., one or more processors) and/or software, in some examples. The training controller 104 may interface with other components to facilitate a training program. A particular training program may be obtained by the training controller 104 from local storage (e.g., native or side-loaded program 102) that is either pre-loaded in the system, or side-loaded by a user of the system. In some examples, a particular training program may be obtained from a remote system (e.g., streamed internet program 100) via a communication network such as the internet.

A training program may include instructions for controlling and/or responding to the vehicle sensors 106, the vehicle actuators 108, and/or the feedback mechanisms 110, as described in more detail below.

The vehicle sensors 106 may provide information to the training controller 104 about the vehicle and the vehicle's environment during the training, and the training program may specify responses to the information gathered from the sensors (e.g., triggering one or actuators 108 and/or one or more feedback mechanisms 110). The training program may specify for the training controller to monitor particular sensors for particular values/conditions/criteria, and then trigger actuators or feedback mechanisms in response to those values/conditions/criteria.

The feedback mechanisms 110 may be triggered in response to instructions of the training program. For example, a display device may present a user interface indicating the start of the training program and providing training information/instructions to the operator 112, an audio warning may be played in response to information from the sensors indicating the vehicle is about to hit a curb, and/or haptic feedback may be triggered on the steering wheel in response to information from the actuators indicating that the operator turned the wheel in the wrong direction, among other possibilities.

The vehicle actuators 108 may provide input to the training controller (e.g., information indicating the operator is manipulating an actuator, such as a steering wheel or gas pedal) and/or receive output from the training controller resulting from an instruction of the training program (e.g., the training program may automatically manipulate the steering wheel and/or the pedals, among other possibilities).

For example, a parallel parking training program can include a first step of driving forward past a desired parking space until the vehicle is side-by-side with the vehicle in front of the desired parking space. The program can begin with an instruction to present on a display device a user interface requesting the operator to drive forward until the vehicle is side-by-side with the vehicle directly in front of the desired parking space.

During the first step, the program can include an instruction to manipulate the actuators to prevent the operator from turning the steering wheel until this first step is complete.

The program can also include an instruction to monitor the sensors (e.g., radar, LIDAR, cameras, etc.) as the user drives and notify the operator via a feedback mechanism (e.g., a visual indication on the display, an audio indication, etc.) once the vehicle is side-by-side with the vehicle directly in front of the desired parking space.

Further, the program can include an instruction to monitor the sensors to determine the position of the vehicle and, if the operator did not successfully move the vehicle side-by-side with the vehicle directly in front of the desired parking space, to manipulate the actuators of the gas pedal, brake, and/or steering wheel to maneuver the vehicle into the proper position.

In some examples, the operator's success or failure to move the vehicle into the proper position can be recorded and entered into a report on driving ability and/or transmitted to a third party, such as a driver training organization or a government agency for issuing driver's licenses. In some examples, the vehicle can record and report additional information such as reaction time of the operator.

In some examples, the training program can act as a simple interactive user manual (e.g., instructing the operator how to turn on the air conditioner or de-fog the windscreen, among other possibilities).

Figure 2:
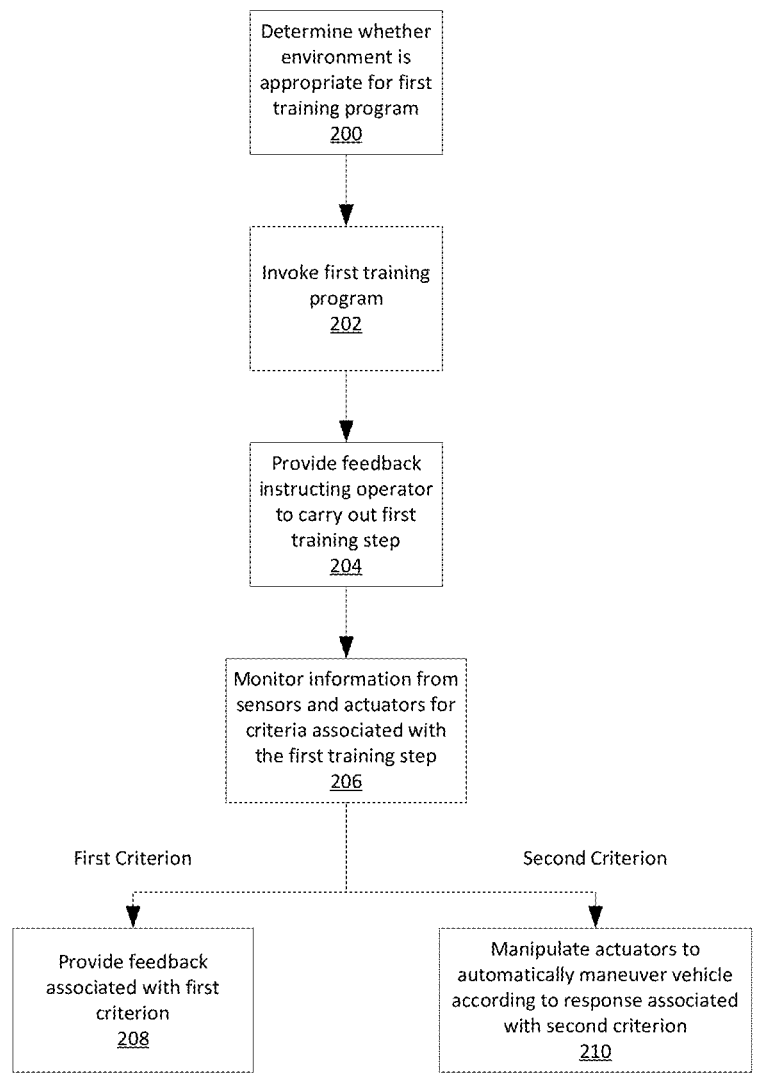
FIG. 2 illustrates an exemplary method of providing vehicle operator training in a vehicle according to examples of the disclosure.

FIG. 2 illustrates an exemplary method of providing vehicle operator training in a vehicle according to examples of the disclosure. The vehicle may include one or more feedback mechanisms, one or more sensors, and one or more actuators. The vehicle can determine (200) whether an environment of the vehicle is appropriate for a first training program based on first information from the one or more sensors. For example, the vehicle may need to determine that an open parking space is nearby before beginning parallel parking training, or the vehicle may need to determine there is a nearby freeway onramp before beginning freeway merging training. The determination may be based on location of the vehicle obtained via GPS, or based on other vehicles surrounding the vehicle or recognized objects such as curbs, painted lines, etc. The information from the one or more sensors may include one or more of location information from a GPS sensor and nearby object information from a camera, LIDAR, or proximity sensor, among other possibilities.

In response to determining the environment is appropriate for the first training program, the vehicle can invoke (202) the first training program including a plurality of training steps. Invoking can include starting a training program that has already been stored on the vehicle, and/or it can include downloading some or all of the program or program resources from a remote server over a communications network such as the internet.

The vehicle can provide (204), via the one or more feedback mechanisms, feedback instructing an operator of the vehicle to carry out a first training step associated with the first training program. Providing feedback may include one or more of presenting a user interface on a display device of the vehicle (e.g., a user interface with text explaining what the operator needs to do for the first training step, possibly including visual aids such as images or video illustrating the first step), providing haptic feedback on a steering wheel of the vehicle (e.g., a vibration if the operator turns the steering wheel in the wrong direction or to the wrong steering angle, as specified by the training step), and/or playing audio on a speaker of the vehicle (e.g., audio describing the first training step, possibly generated by a text-to-speech algorithm from text associated with the first training step).

During the first training step, the vehicle can monitor (206) second information from the one or more sensors and the one or more actuators for a plurality of criteria associated with the first training step of the first training program. Monitoring for the plurality of criteria may include one or more of determining whether a location of the vehicle is within a threshold distance of a target location associated with the first training step (e.g., side-by-side with a vehicle as described above in the parallel parking training), determining whether a steering angle of a steering wheel of the vehicle is within a threshold of a target steering angle associated with the first training step, and/or determining whether a gas or brake pedal is depressed as specified by the first training step, among other possibilities.

In accordance with the second information meeting a first criterion of the plurality of criteria, the vehicle can provide (208), via the one or more feedback mechanisms, feedback associated with the first criterion. For example, if the second information indicates that the operator has turned the wheel to an incorrect steering angle as specified by the training step, the vehicle can vibrate the steering wheel to indicate the incorrect steering angle to the operator. In another example, if the second information indicates that the operator has stopped the vehicle within the threshold distance from the target location, audio feedback can be played on speakers of the vehicle communicating to the operator that the first step has been successfully completed.

In accordance with the second information meeting a second criterion of the plurality of criteria (different from the first criterion), the vehicle can manipulate (210) the one or more actuators to automatically maneuver the vehicle according to a response associated with the second criterion. For example, if the second information indicates that the operator has stopped the vehicle outside the threshold distance from the target location, the vehicle can automatically maneuver to the target location by manipulating the gas, brake, and/or steering wheel, thereby bringing the vehicle to the location necessary for progression to the next training step in the training program. In some examples, a target location may be a target parking space for the vehicle. In some examples, a target location may be a relative location. For example, in a freeway merging training, the target location may be the center of a lane relative to the painted boundaries of the lane, but may not be limited to an absolute location as determined by location hardware such as GPS, for example.

Figure 3:
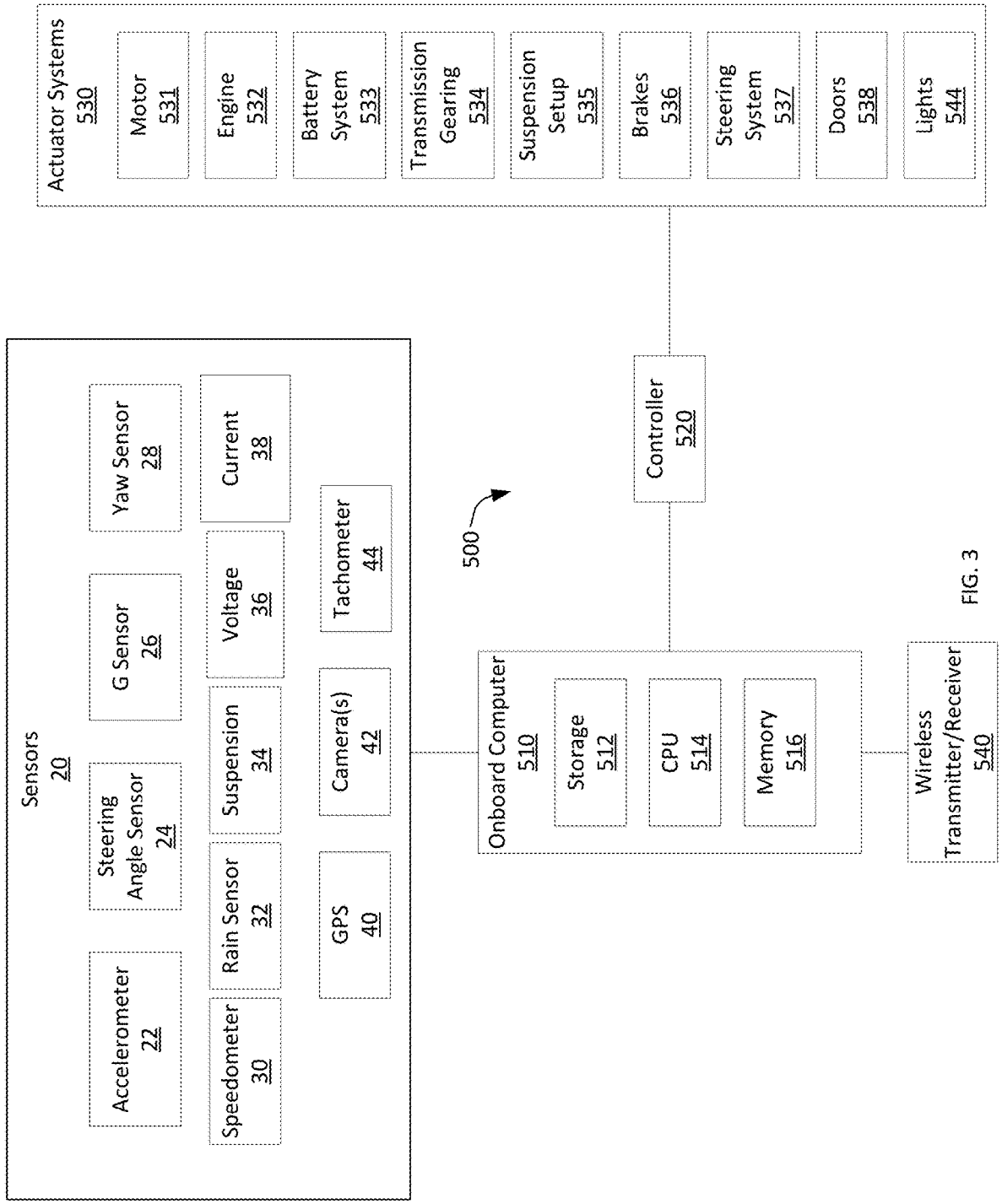
FIG. 3 illustrates a system block diagram according to examples of the disclosure.

FIG. 3 illustrates a system block diagram according to examples of the disclosure. Vehicle control system 500 can perform any of the methods described with reference to FIGS. 1-2. System 500 can be incorporated into a vehicle, such as a consumer automobile. Other example vehicles that may incorporate the system 500 include, without limitation, airplanes, boats, or industrial automobiles. Vehicle control system 500 can include an on-board computer 510. On-board computer 510 can include storage 512, memory 516, and a processor 514. Processor 514 can perform any of the methods described with reference to FIGS. 1-2. Additionally, storage 512 and/or memory 516 can store data and instructions for performing any of the methods described with reference to FIGS. 1-2. Storage 512 and/or memory 516 can be any non-transitory computer readable storage medium, such as a solid-state drive or a hard disk drive, among other possibilities. The vehicle control system 500 can also include a controller 520 capable of controlling one or more aspects of vehicle operation.

In some examples, the vehicle control system 500 can be connected to (e.g., via controller 520) one or more actuator systems 530 in the vehicle. The one or more actuator systems 530 can include, but are not limited to, a motor 531 or engine 532, battery system 533, transmission gearing 534, suspension setup 535, brakes 536, steering system 537 door system 538, and lights system 544. Additional actuator systems 530 can include, but are not limited to, key-fob buttons, adaptive cruise control, front-facing cameras, surround-view cameras, side mirror control, lock/unlock of doors, turn signal, windscreen wipers, radio buttons, vehicle lighting, windows, door/trunk/hood switches, climate controls, and/or stability controls.

In some examples, the vehicle control system 500 can include one or more sensors 20 including, but not limited to: an accelerometer 22 to determine the rate of acceleration of the vehicle; a steering angle sensor 24 to determine the angle of the steering wheel as measured from a neutral position indicating that the front wheels of the vehicle are parallel and pointing straight forward; a G or gravitational sensor 26 to determine the direction of gravity relative to the plane of the vehicle chassis; a yaw sensor 28 to determine the orientation of the chassis with respect to direction of travel; a speedometer 30 to determine the present speed of the vehicle; a rain sensor 32 to determine whether the vehicle is operating in the rain; a suspension sensor 34 to determine the stiffness of the suspension; a voltage sensor 36 for measuring the battery voltage; a current to measure 38 the current flow to or from the battery sensor; a GPS receiver 40 to receive location information from the GPS satellite system; one or more cameras 42 both for external and internal surveillance; and a tachometer 44. Additional sensors may include, but are not limited to, occupant classification (e.g., which seats are occupied and classifications of the occupants such as adult/child/etc.), blind-spot monitoring, and/or ambient light/tunnel sensor.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of providing vehicle operator training in a vehicle including one or more feedback mechanisms, one or more sensors, and one or more actuators, the method comprising:
    based on first information from the one or more sensors, determining whether the surroundings of the vehicle include one or more elements necessary for a first training program;
    in response to determining the surroundings of the vehicle include the one or more elements necessary for the first training program, invoking the first training program including a plurality of training steps;
    providing, via the one or more feedback mechanisms, feedback instructing an operator of the vehicle to carry out a first training step associated with the first training program;
    monitoring second information from the one or more sensors and the one or more actuators for a plurality of criteria associated with the first training step of the first training program;
    in accordance with the second information meeting a first criterion of the plurality of criteria, the first criterion indicative of the operator of the vehicle successfully completing the first training step, providing, via the one or more feedback mechanisms, first feedback associated with the first criterion;
    in accordance with the second information meeting a second criterion of the plurality of criteria, the second criterion indicative of a first failure of the operator of the vehicle to complete the first training step, providing, via the one or more feedback mechanisms, second feedback associated with the second criterion; and
    in accordance with the second information previously meeting the second criterion and in accordance with the second information meeting a third criterion of the plurality of criteria, the third criterion indicative of a second failure of the operator of the vehicle failing to complete the first training step, manipulating the one or more actuators to automatically maneuver the vehicle according to a response associated with the third criterion.

2. The method of claim 1, wherein the first and second information from the one or more sensors include one or more of location information from a GPS sensor and nearby object information from a camera, LIDAR, or proximity sensor.

3. The method of claim 2, wherein the nearby object information includes information about one or more nearby vehicles.

4. The method of claim 1, wherein providing the first and second feedback includes one or more of presenting a user interface on a display device of the vehicle, providing haptic feedback on a steering wheel of the vehicle, and playing audio on a speaker of the vehicle.

5. The method of claim 1, wherein manipulating one or more actuators includes manipulating one or more of brakes, gas pedal, and a steering wheel of the vehicle.

6. The method of claim 1, wherein monitoring for the plurality of criteria includes one or more of determining whether a location of the vehicle is within a threshold distance of a target location associated with the first training step, determining whether a steering angle of a steering wheel of the vehicle is within a threshold of a target steering angle associated with the first training step, and determining whether a gas or brake pedal is depressed as specified by the first training step.

7. The method of claim 1, wherein the response associated with the third criterion includes automatically maneuvering the vehicle into a target location associated with the first training step.

8. A computer-readable storage medium storing instructions which, when executed by one or more processors of a vehicle including one or more feedback mechanisms, one or more sensors, and one or more actuators, cause the vehicle to perform a method of providing vehicle operator training in the vehicle, the method comprising:
    based on first information from the one or more sensors, determining whether the surroundings of the vehicle is include one or more elements necessary for a first training program;
    in response to determining the surroundings of the vehicle include the one or more elements necessary for the first training program, invoking the first training program including a plurality of training steps;
    providing, via the one or more feedback mechanisms, feedback instructing an operator of the vehicle to carry out a first training step associated with the first training program;

monitoring second information from the one or more sensors and the one or more actuators for a plurality of criteria associated with the first training step of the first training program;

in accordance with the second information meeting a first criterion of the plurality of criteria, the first criterion indicative of the operator of the vehicle successfully completing the first training step, providing, via the one or more feedback mechanisms, first feedback associated with the first criterion;

in accordance with the second information meeting a second criterion of the plurality of criteria, the second criterion indicative of a first failure of the operator of the vehicle to complete the first training step, providing, via the one or more feedback mechanisms, second feedback associated with the second criterion; and in accordance with the second information previously meeting the second criterion and in accordance with the second information meeting a third criterion of the plurality of criteria, the third criterion indicative of a second failure of the operator of the vehicle failing to complete the first training step, manipulating the one or more actuators to automatically maneuver the vehicle according to a response associated with the third criterion.

9. A vehicle, comprising:
one or more processors;
one or more feedback mechanisms;
one or more sensors;
one or more actuators; and
a memory storing instructions, which, when executed by the one or more processors, cause the vehicle to perform a method of providing vehicle operator training in the vehicle, the method comprising:
based on first information from the one or more sensors, determining whether the surroundings of the vehicle is include one or more elements necessary for a first training program;
in response to determining the surroundings of the vehicle include the one or more elements necessary for the first training program, invoking the first training program including a plurality of training steps;
providing, via the one or more feedback mechanisms, feedback instructing an operator of the vehicle to carry out a first training step associated with the first training program;
monitoring second information from the one or more sensors and the one or more actuators for a plurality of criteria associated with the first training step of the first training program;
in accordance with the second information meeting a first criterion of the plurality of criteria, the first criterion indicative of the operator of the vehicle successfully completing the first training step, providing, via the one or more feedback mechanisms, first feedback associated with the first criterion;

in accordance with the second information meeting a second criterion of the plurality of criteria, the second criterion indicative of a first failure of the operator of the vehicle to complete the first training step, providing, via the one or more feedback mechanisms, second feedback associated with the second criterion; and in accordance with the second information previously meeting the second criterion and in accordance with the second information meeting a third criterion of the plurality of criteria, the third criterion indicative of a second failure of the operator of the vehicle failing to complete the first training step, manipulating the one or more actuators to automatically maneuver the vehicle according to a response associated with the third criterion.

10. The method of claim 1 further comprising:
further in accordance with the second information meeting the first criterion, providing, via the one or more feedback mechanisms, feedback instructing the operator of the vehicle to carry out remaining training steps of the plurality of training steps of the first training program; and
subsequent to providing feedback instructing the operator of the vehicle to carry out the remaining training steps of the plurality of training steps of the first training program, and in accordance with a determination that the operator of the vehicle successfully completed the first training program, report data to a memory indicating that the first training program was successfully completed.

11. The method of claim 10, further comprising:
further in accordance with the second information meeting the third criterion, foregoing the feedback instructing the operator of the vehicle to carry out the remaining training steps of the first training program and recording report data to the memory indicating that the first training program was not successfully completed.

12. The method of claim 11, further comprising:
determining, based on third information from the report data, whether the first training program was successfully completed;
in response to determining that the first training program was not successfully completed, determining whether the surroundings of the vehicle include the one or more elements necessary for the first training program, and in response to determining the surroundings of the vehicle include the one or more elements necessary for the first training program, invoking the first training program again; and
in response to determining the first training program was successfully completed, foregoing invoking the first training program again.

13. The method of claim 1, wherein the one or more elements necessary for the first training program include at least one of: an open parking space, a freeway onramp, and a trailer.

* * * * *